United States Patent [19]

Ozburn

[11] Patent Number: 5,356,168
[45] Date of Patent: Oct. 18, 1994

[54] SNOW BOARD PARKING BRAKE APPARATUS

[76] Inventor: James C. Ozburn, 11150 Highway 24, Falcon, Colo. 80831

[21] Appl. No.: 988,469

[22] Filed: Dec. 10, 1992

[51] Int. Cl.$^5$ .......................... A63C 7/10; A63C 11/18
[52] U.S. Cl. ..................... 280/605; 280/813; 280/14.2
[58] Field of Search ............... 280/604, 605, 809, 813, 280/816, 14.2, 607

[56] References Cited

U.S. PATENT DOCUMENTS

| | | | |
|---|---|---|---|
| 4,884,822 | 12/1989 | Boisselle | 280/605 |
| 4,927,176 | 5/1990 | King et al. | 280/813 |
| 5,042,839 | 8/1991 | Ciari | 280/813 |
| 5,156,644 | 10/1992 | Koehler | 280/605 |

*Primary Examiner*—Richard M. Camby
*Attorney, Agent, or Firm*—Phillip A. Rein

[57] ABSTRACT

A snow board parking brake apparatus for holding a snow board at rest during the time a snow boarder is attaching or detaching the snow boarder's boots to or from the snow board bindings. A function of this invention is to make snow boarding more enjoyable by 1) holding the snow board member stable on the snow while the snow boarder is attaching or detaching the snow boarder's boots and snow board bindings; 2) removing snow build-up on the snow boarder's boot soles; 3) providing a convenient handle to hand carry the snow board when the snow boarder is walking; and 4) providing convenient rings to attach a carrying strap to put over the snow boarder's shoulder or a padlock and chain assembly for security during storage of the snow board member. The snow board parking brake apparatus includes 1) a basic support base assembly secured to the snow board member; and 2) a main parking brake assembly mounted on the basic support base assembly. The main brake parking assembly has to move a brake blade assembly movable in an upwardly, laterally, and downward position extended laterally and below a lower surface of the snow board member.

19 Claims, 5 Drawing Sheets

SNOW BOARD PARKING BRAKE APPARATUS

PRIOR ART

A patent search revealed the following United States patent references:

| U.S. Pat. No. | Invention | Inventor |
| --- | --- | --- |
| 2,134,587 | BRAKE FOR SLEDS AND JUMPERS | Joseph M. Simmons |
| 2,359,076 | SCOOTER BOB | Mervil D. Asbury |
| 2,997,309 | SKI ATTACHMENT TO PREVENT LOOSE SKIS FROM SLIDING DOWN GRADE | William J. Van Natter |
| 3.628.804 | SNOW SURFBOARD | Ronald Carreiro |
| 4,116,461 | BRAKE DEVICE FOR SKIS | Krob et al |
| 4,256,319 | TOBOGGAN | Richard D. Winter |
| 4,311,215 | BRAKE FOR A SLIDE COASTER SLED | Becker et al |
| 4,379,570 | SKI STOPPER | Gerhard Sedlmair |
| 4,792,155 | SAFETY BINDING APPARATUS FOR MONOSKIS | Bertrand Besnier |
| 4,795,183 | BRAKE FOR INSTALLATION ON A SNOW SKI | Karl-Josef Reuters |

The Simmons patent discloses a brake for sleds and jumpers which is lever actuated and has braking projections.

The Asbury patent discloses a scooter ski type structure having a brake assembly thereon. The brake assembly is activated through a brake pedal and spring biased to a released condition.

The Van Natter, Krob et al, and Sedlmair patents disclose conventional brake devices for snow skis which are released on removing a ski boot from a ski binding.

The Carreiro patent discloses a snow surfboard having a brake structure with fin structures which are not movable but provides a braking action on rocking of the snow surfboard.

The Winter patent discloses a toboggan having lever actuated panel assemblies which act to provide a steering function.

The Becker et al patent discloses a brake for a slide coaster sled which is lever actuated with a blade operable during usage to provide a braking function.

The Besnier patent discloses a brake on a monoski which is mounted on side areas and activated on removal of a ski boot from a boot binding.

The Reuters patent discloses a brake on a snow ski which is spring biased and operable during a skiing operation by activation with a tip portion of a ski pole.

PREFERRED EMBODIMENT OF THE INVENTION

In one preferred embodiment of the invention, a snow board parking brake apparatus is readily secured to a snow board assembly to provide means for providing a brake to park the snow board assembly to prevent from sliding down an inclined support surface normally covered with snow and/or ice.

The snow board parking brake apparatus is selectively operable to move a portion thereof from a storage condition by an operator thereof upwardly, laterally, and downwardly below a bottom surface of the snow board assembly to engage the snow and/or ice on the support surface to achieve the parking function of this invention.

The snow board assembly is of a generally conventional nature having a snow board member with a boot support pad member thereon and a pair of spaced boot anchor bindings to receive the respective front and rear foot boots worn by an operator utilizing the snow board assembly.

The snow board parking brake apparatus includes 1) a basic support base assembly secured to a central portion and along one side wall portion of the snow board member 2) a main parking brake assembly mounted on the basic support base assembly and 3) a main brake housing assembly mounted about the main parking brake assembly for enclosing same.

The basic support base assembly includes 1) a mounting plate member secured to the snow board member 2) a base plate member mounted over the mounting plate member; 3) a main hinge member pivotally connecting the base plate member to the mounting plate member; and 4) a plate bias assembly secured to the mounting plate member and operably connected through a compression spring member to the base plate member so as to provide shock absorbing movement of the base plate member about the main hinge member.

The main parking brake assembly includes 1) a brake anchor and support assembly mounted on the base plate member; 2) a movable blade and brake actuator assembly connected to the brake anchor and support assembly; and 3) an actuator brake handle assembly pivotally connected to the brake anchor and support assembly and operably connected through a cam action to the movable blade and brake actuator assembly.

The brake anchor and support assembly includes outer actuator support plates, spring support plates, and inner handle support plates, all being of L-shape and secured to an upper surface of the base plate member for operable connection to the movable blade and brake actuator assembly.

The movable blade and brake actuator assembly includes a main brake actuator assembly connected to a brake blade assembly. The main brake actuator assembly includes an actuator housing member with side wall members having elongated, irregularly shaped slots therein for unique cam movement of the movable blade and brake actuator assembly when operated through the actuator brake handle assembly.

The brake blade assembly is of an irregular shape having an upper support blade section integral with a lower support blade section. Each of the support blade sections are provided with vertical wall portions, fin members, and end wall portions specifically designed as will be explained for grasping the snow and/or ice adjacent an edge of the snow board member during a parking operation as will be explained.

The actuator brake handle assembly includes a main actuator assembly secured to a main handle assembly. The main actuator assembly includes a pair of spaced actuator support plates interconnected to an actuator control assembly.

The actuator control assembly includes link members, pivot pin members, cam pivot members, and tension spring members which interconnect the parallel, spaced actuator support plates for conjoint movement in a manner to be explained.

The main handle assembly includes a main handle member connected to a main bias assembly. The main handle member has an arcuate forward section integral with a support section. The main bias assembly includes a tension spring member connected to the main handle member and a portion of the actuator control assembly operating to bias the main handle member upwardly.

The main handle assembly is operable to be pivoted about the actuator support plates to move from a compact storage condition to a braking function on the upward movement thereof. This moves the movable blade and brake actuator assembly upwardly, laterally, outwardly, and a portion of the brake blade assembly downwardly of the snow board member to engage the snow and/or ice in a braking function as will be explained in detail.

The main brake housing assembly includes 1) an outer housing cover member; 2) a boot scraper assembly; and 3) a handle latch assembly. The outer housing cover member provides a protective enclosure for the main parking brake assembly to prevent snow and ice from entering and causing malfunctioning thereof.

The boot scraper assembly provides a pair of blade members mounted on the outer housing cover member used by the operator of the snow board assembly to selectively remove snow and/or ice from snow board boot members.

The handle latch assembly includes a latch member which is mounted on the outer housing cover member and engagable with a portion of the actuator brake handle assembly to hold in the collapsed, storage, or non-braking condition until positively released by the operator of the snow board assembly.

OBJECTS OF THE INVENTION

One object of this invention is to provide a snow board parking brake apparatus which can be easily mounted on a new or existing snow board assembly along a side wall portion or edge thereof which is easy to operate; simple to install; and substantially maintenance free.

Another object of this invention is to provide a snow board parking brake apparatus mounted along an edge of a snow board member and readily movable through an actuator brake handle assembly from a compact storage condition to a brake or park condition having a blade portion extended laterally and below a lower surface of the snow board member for angular engagement with the snow and/or ice to prevent movement of the snow board member.

One other object of this invention is to provide a snow board parking brake apparatus mounted along a side wall portion of a snow board member and having a locked actuator brake handle assembly which can be readily released by the snow board operator and moved upwardly to a brake or park condition whereupon a main brake blade assembly is first moved upwardly, laterally, and then downwardly to contact the ice and/or snow on a support surface to park the snow board member for ease of mounting thereof by the operator.

A further object of this invention is to provide a snow board parking brake apparatus having scraper blades thereon for cleaning a bottom sole of an operator's boots and a boot support pad member to receive one of the operator's boots thereon for locking in contact with a portion of a housing cover member of the snow board parking brake apparatus for supporting a snow board member when traveling on a ski lift to provide comfort to the operator.

One further object of this invention is to provide a snow board parking brake apparatus which is easily utilized by an operator thereof as positioned between spaced front and rear boot anchor bindings; readily moved into a holding or parking function through movement of a compact actuator brake handle assembly; and desirable when the operator of the snow board assembly needs to mount into boot anchor bindings before entering a ski lift.

Still, one further object of this invention is to provide a snow board parking brake apparatus which is readily attachable to new or existing snow board members; easy to operate; sturdy in construction; providing a new and novel cam actuated movement of a brake blade assembly upwardly, laterally, and downwardly; and substantially maintenance free.

Various other objects, advantages, and features of the invention will become apparent to those skilled in the art from the following discussion, taken in conjunction with the accompanying drawings, in which:

FIGURES OF THE INVENTION

Figure 1:
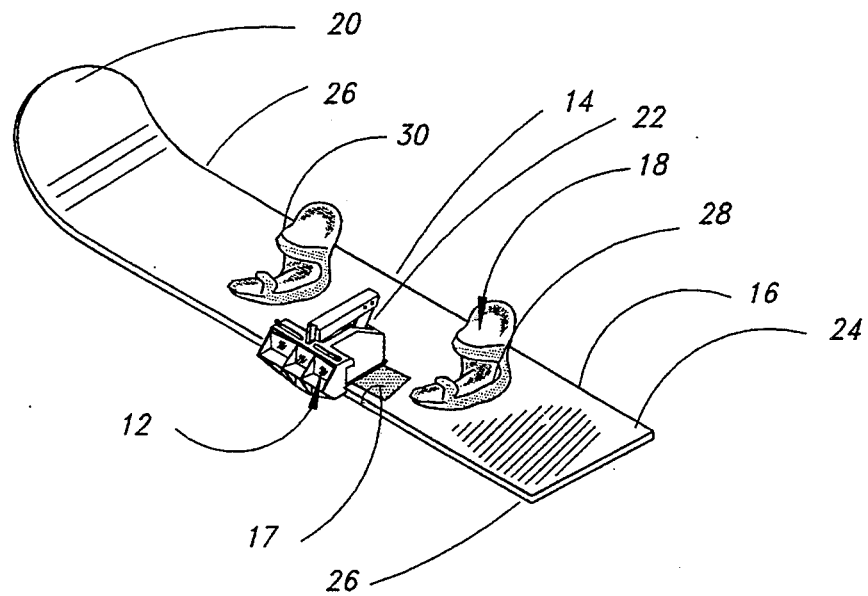
FIG. 1 is a perspective view of a snow board assembly having a snow board parking brake apparatus of this invention mounted thereon between a pair of spaced boot anchor bindings.

The following is a discussion and description of preferred specific embodiments of the snow board parking brake apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, and in particular to FIG. 1, the snow board parking brake apparatus of this invention, indicated generally at 12, is shown as attached to a conventional snow board assembly 14. The purpose and function of the snow board parking brake apparatus 12 is to provide a parking function for a snow board operator during particular snow boarding situations as will be explained.

The snow board assembly 14 includes 1) a snow board member 16 of a conventional shape 2) a boot support pad member 17 mounted on the snow board member 16 and positioned adjacent the snow board parking brake apparatus 12; and 3) a pair of spaced boot anchor bindings 18.

The snow board member 16 has a curved forward section 20 integral with a mid-section 22 having spaced parallel side wall portions 26.

The boot anchor bindings 18 are provided with a rear foot binding 28 and a front foot binding 30 which can be mounted thereon depending on the particular desires of the operator of the snow board assembly 14.

The snow board parking brake apparatus 12 includes 1) a basic support base assembly 32 which is anchored to the snow board member 16 along one of the side wall portions 26 between the boot anchor bindings 18 as noted in FIG., 1; 2) a main parking brake assembly 34 mounted on the basic support base assembly 32; and 3) a main brake housing assembly 36 mounted about the main parking brake assembly 34 and connected to the basic support base assembly 32.

Figure 3:
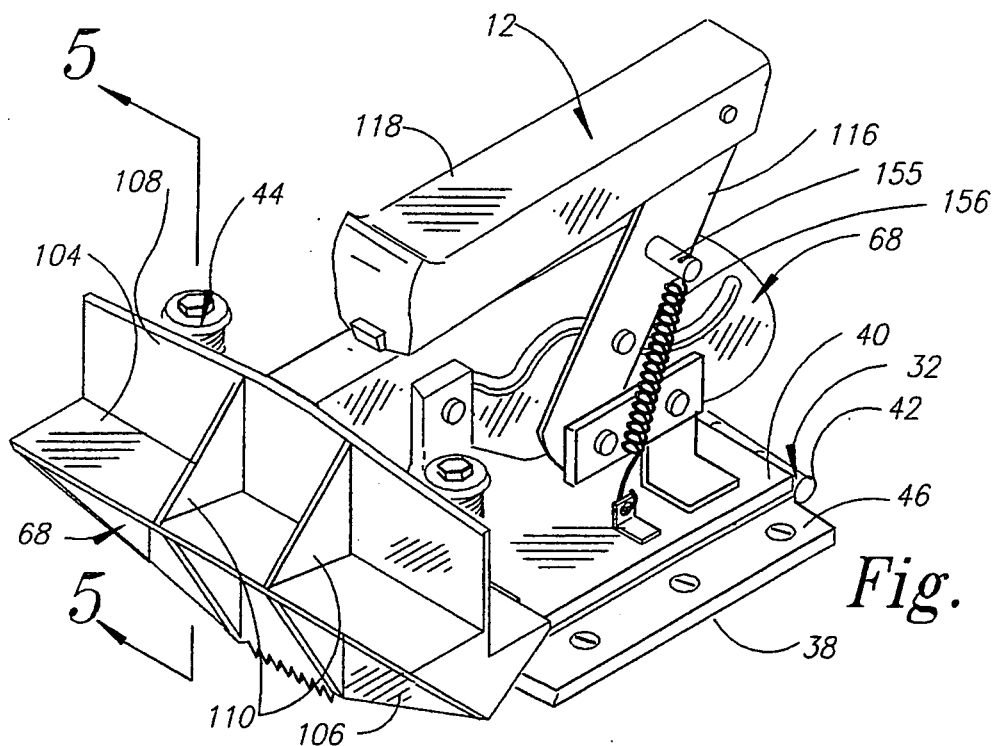
FIG. 3 is a perspective view similar to FIG. 2 of the snow board parking brake apparatus having a main brake housing assembly removed therefrom.
Figure 4:
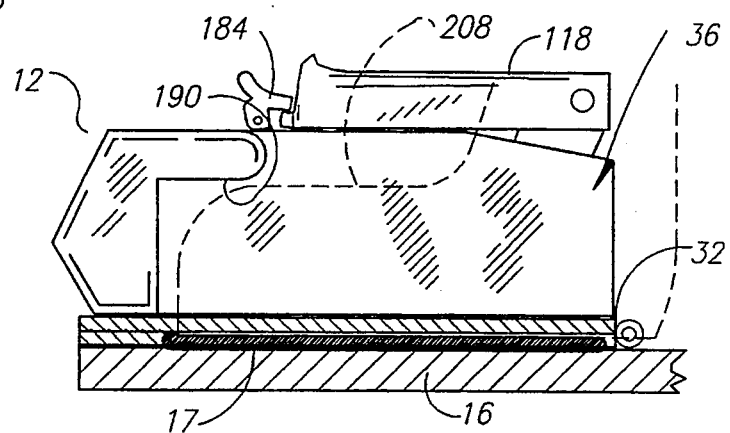
FIG. 4 is an enlarged sectional view taken along line 4-4 in FIG. 1 and illustrating a snow board operator's boot in dotted lines.

As shown in FIG. 3, the basic support base assembly 32 includes 1) a mounting plate member 38 connected to the snow board member 16; 2) a base plate member 40 mounted in an overlying position on the mounting plate member 38; 3) a main hinge member 42 interconnecting one edge of the base plate member 40 to the adjacent mounting plate member 38; and 4) a plate bias assembly 44 operably connected to the base plate member 40 and the mounting plate member 38 in a manner to be explained.

Figure 2:
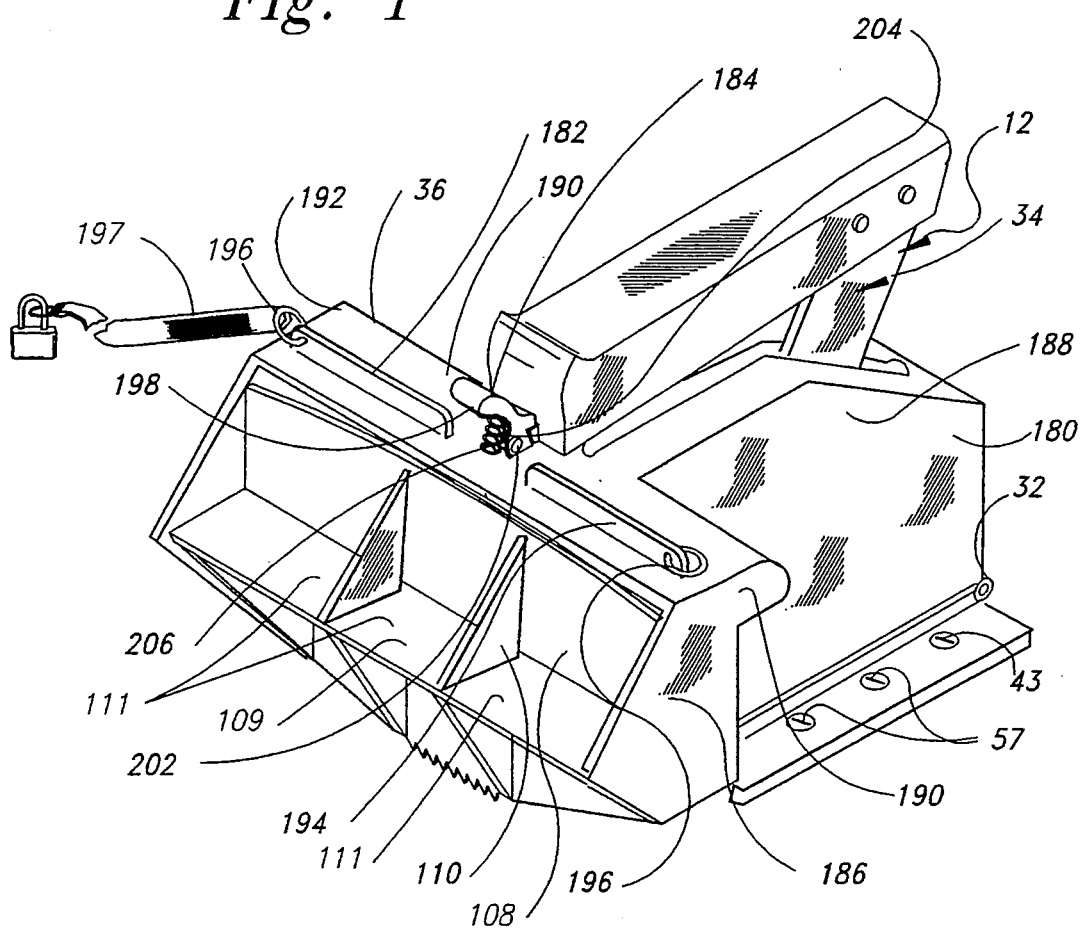
FIG. 2 is a perspective view of the snow board parking brake apparatus of this invention.

As shown in FIG. 2, a plurality, namely six (three on a side), spaced anchor members 43 are used to secure the mounting plate member 38 to the snow board member 16. The anchor members 43 are preferably wood type screw members 57 which are mounted through connector holes 50 for threaded engagement into drilled holes in the snow board member 16 to provide rigidity to the overall snow board parking brake apparatus 12.

The mounting plate member 38 is of a generally rectangular shape having a main body section 46 with threaded bolt anchor holes 48 plus the connector holes 50 to receive the screw members 57 therethrough.

The base plate member 40 is of a generally rectangular shape, smaller in width but the same length as the mounting plate member 38, and having a pair of spaced bolt clearance holes 52 therein.

Figure 8:
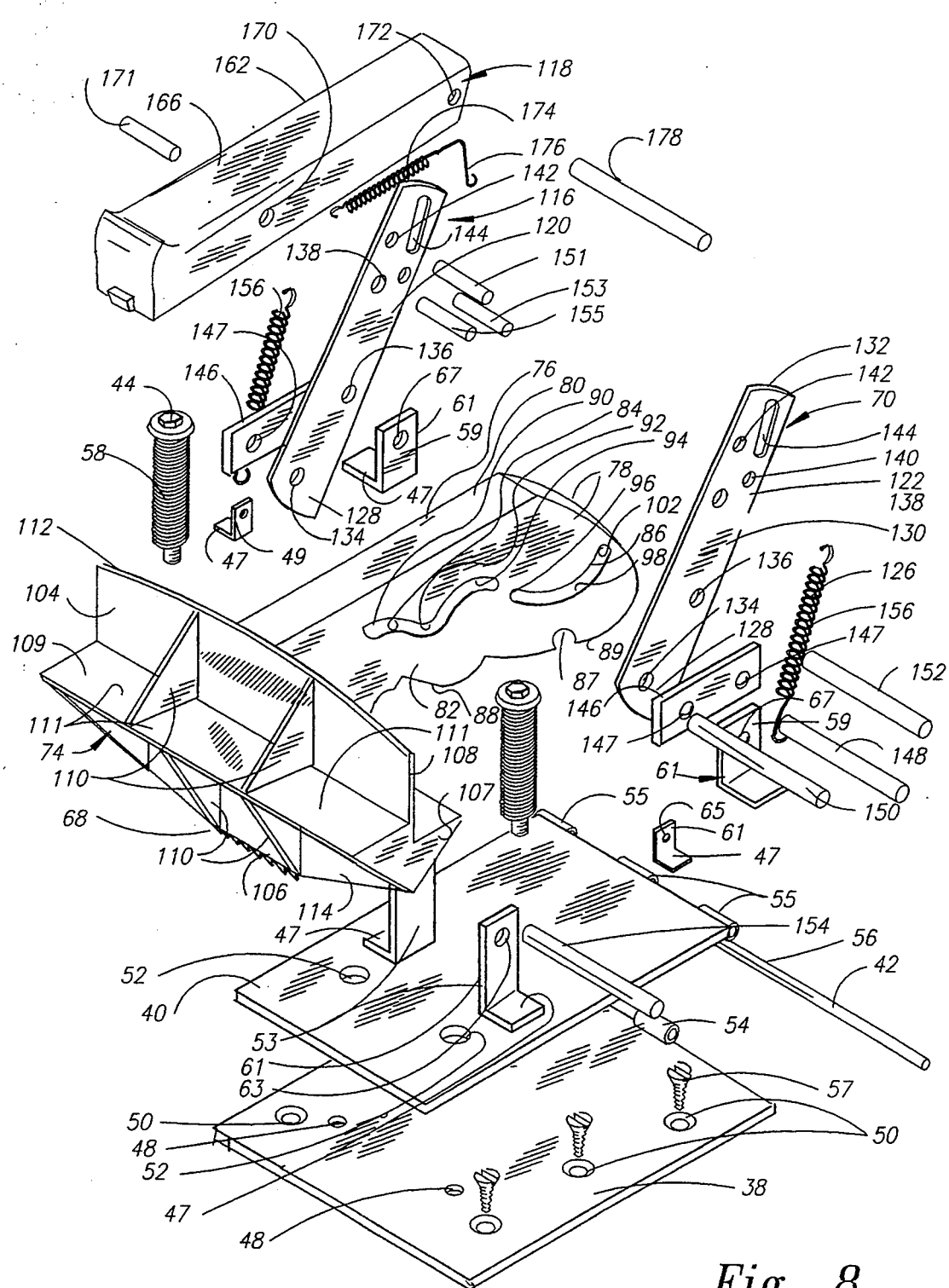
FIG. 8 is an exploded perspective view of the snow board parking brake apparatus having the main brake housing assembly removed therefrom.

As shown in FIG. 8, the main hinge member 42 includes 1) a first hinge section 54 connected to the mounting plate member 38; 2) a second hinge section 55 connected to the base plate member 40; and 3) a connector shaft member 56 mounted through adjacent aligned ones of the first and second hinge sections 54, 55 in a conventional manner. The main hinge member 42 is operable to provide pivotal movement of the base plate member 40 along one edge of the anchored mounting plate member 38.

Figure 5:
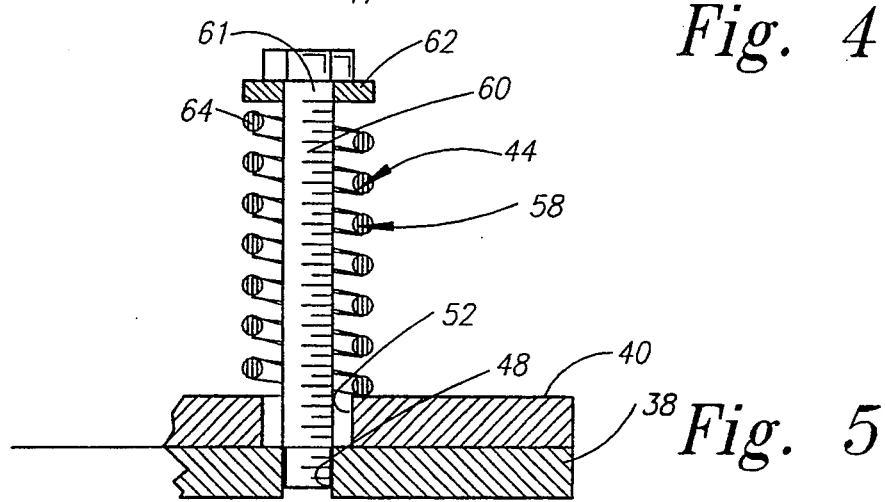
FIG. 5 is an enlarged fragmentary sectional view taken along line 5-5 in FIG. 3.

The plate bias assembly 44 consists of a pair of spaced identical spring biased assemblies 58 (FIG. 8). As noted in FIG. 5, each spaced spring biased assembly 58 includes 1) a threaded anchor bolt member 60 having one end threaded into the bolt anchor holes 48 in the mounting plate member 38; 2) a cap washer member 62 mounted adjacent a head portion 61 of the anchor bolt member 60; and 3) a compression spring member 64 having one end mounted against an upper surface of the base plate member 40 and an opposite end against an undersurface of the cap washer member 62. It is noted that this achieves a spring compression against the base plate member 40 when it is moved upwardly in a pivotal movement about the main hinge member 42.

The main parking brake assembly 34 includes 1) a brake anchor and support assembly 51 connected to an upper surface of the base plate member 40; 2) a movable blade and brake actuator assembly 68 connected to the brake anchor and support assembly 51; and 3) an actuator brake handle assembly 70 connected to portions of the brake anchor and support assembly 51 and to the movable blade and brake actuator assembly 68.

The brake anchor and support assembly 51 includes 1) outer actuator support plates 53 placed in cooperating relationship adjacent the bolt clearance holes 52; 2) spring support plates 49; and 3) inner handle support plates 59 operable to receive the actuator brake handle assembly 70 connected thereto.

The outer actuator support plates 53 are of L-shape, each having an upright leg section 61 integral with an anchor leg section 47. Each upright leg section 61 has a pin hole 63 so that both pin anchor holes 63 in the spaced upright leg section 61 are in alignment for reasons to become obvious. The anchor leg sections 47 are secured to an upper surface of the base plate member 42 by adhesive, screws, or other known connecting means.

The spring support plates 49 are each of L-shape having an upright leg section 61 integral with an anchor leg section 47. Each upright leg section 61 has a spring connector hole 65 therein.

The inner handle support plates 59 are L-shaped, having an upright leg section 61 integral with an anchor leg section 47 and having a pivot pin hole 67 in each upright leg section 61.

It is noted that the support plates 49, 53, 59 are substantially identical except varying in size and all utilized with holes therein to receive various elements such as pivot pins or springs as will be explained.

The movable blade and brake actuator assembly 68 includes 1) a main brake actuator assembly 72 connected to a brake blade assembly 74. The main brake actuator assembly 72 includes an actuator housing member 76 having identical parallel side wall members 78 integral along spaced, adjacent upper edges with a top wall member 80.

Each side wall member 78 includes a main body section 82 having therein 1) an actuator guide slot 84; 2) a movement guide slot 86; 3) an anchor notch 87; and 4) a brake support edge 88.

The main body section 82 is of a irregular shape having an outer curved wall section 89 enabling the unique movement of the entire movable blade and brake actuator assembly 68 as will be described.

The actuator guide slot 84 is provided with a first arcuate section 90 integral with an intermediate arcuate section 92 which, in turn, is integral with a rear arcuate section 94. The actuator guide slot 84, as noted, is of a generally sea gull or wing shape for reasons to be explained during use and operation of the snow board parking brake apparatus 12.

The movement guide slot 86 is provided with a first section 96 integral with an intermediate section 98 which, in turn, is integral with a rear section 102. The movement guide slot 86 is of a generally arcuate shape to achieve the unique movement of the movable blade and brake actuator assembly 68 as will be explained.

Figure 6:
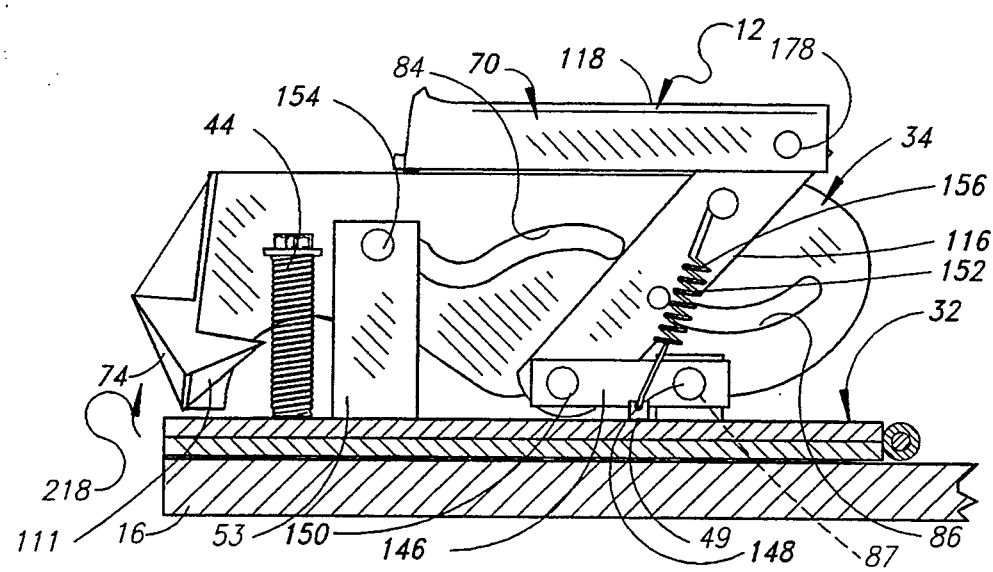
FIG. 6 is an enlarged sectional view taken along line 6-6 in FIG. 1 having the main brake housing assembly removed.

The anchor notch 87 achieves a locking function with a pivot pin when the snow board parking brake apparatus 12 is in a non-usage or storage condition as noted in FIG. 6.

Figure 7:
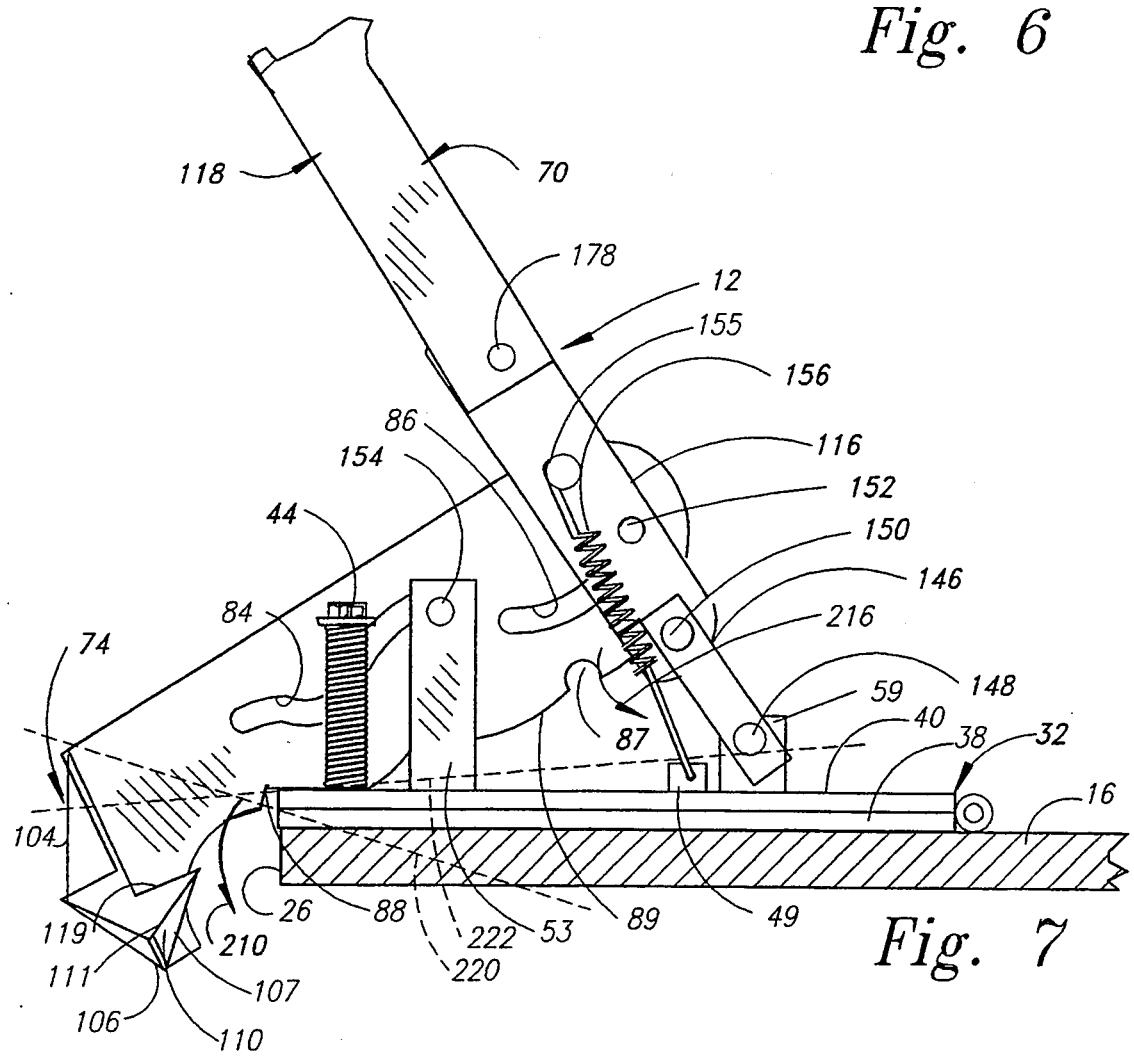
FIG. 7 is a view similar to FIG. 6 illustrating the snow board parking brake apparatus in a brake or park actuated condition used for grasping ice and/or snow.

The brake support edge 88 contacts an upper surface of the base plate member 40 when the snow board parking brake apparatus 12 is in a park or brake condition as noted in FIG. 7.

As noted in FIG. 8, the brake blade assembly 74 includes an upper support blade section 104 integral with a lower support blade section 106 and an inner support blade section 107. The upper support blade section 104 includes a vertical wall portion 108, a horizontal wall portion 109, and spaced vertical fin members 110. The upper support blade section 104 with the fin members 110 adds rigidity with minimum weight. The vertical wall portion 108 is provided with an upper inclined top edge portion 112. Cup type areas 111 of generally V-shape are formed between the fin members 110, the vertical wall portion 108, and the horizontal wall portion 109 to aid in a holding or parking function when in a downhill position as will be explained.

The lower support blade section 106 includes the fin members 110; a vertical wall portion 114 with serrations 115 between the fin members 110; the horizontal wall portion 109; and end wall sections 117 to provide the necessary strength thereto.

The inner support blade section 107 includes the fin members 110; the vertical wall portion 114; and a horizontal wall section 119, all cooperating to form cup type areas 111 therebetween.

As noted in FIG. 7 in the brake or park condition of the snow board parking brake apparatus 12, the fin members 110 and vertical wall portion 114 of the lower support blade section 106 are operable to engage on snow and/or ice as extended outwardly of the adjacent side wall portion 26 and below a bottom surface of the snow board member 16.

As best noted in FIG. 8, the actuator brake assembly or actuator means 70 includes 1) a main actuator assembly 116 connected to the brake anchor and support assembly 51; and 2) a main handle assembly 118 connected to the main actuator assembly 116 and the main brake actuator assembly 72.

The main actuator assembly 116 includes 1) a pair of spaced cooperating actuator support plates 120, 122; and 2) an actuator control assembly 126 operable to interconnect the actuator support plates 120, 122 and to the brake actuator support assembly 51 and the respective L-shaped support plates 49, 53, 59.

Each actuator support plate 120, 122 includes 1) a link connector section 128; 2) a cam connector section 130 integral with the link connector section 128; and 3) a handle connector section 132 integral with the cam connector section 130. Each link connector section 128 is provided with a connector hole 134 aligned with the identical hole in the spaced actuator support plates 120, 122.

Each cam connector section 130 has an aligned cam pin hole 136 and a tension spring connector hole 138.

The handle connector section 132 is provided with a cable connector hole 140, a cable pin guide hole 142, and an inclined handle guide slot 144.

The actuator control assembly 126 is provided with a pivotal link member 146, a first pivot pin or shaft 148, a second pivot pin or shaft 150, a cable support pin or shaft 151, a first cam pin or shaft 152, a cable connector pin or shaft 153, a second cam pin or shaft 154, a support pin or shaft 155, and a pair of tension spring members 156.

Each pivot link member 146 is provided with spaced pin holes 147 operable to receive respective ones of the second pivot pin 150 and the first pivot pin 148.

Each first pivot pin 148 is operable to be mounted through respective ones of the pivot pin holes 67 in the inner handle support plates 59 as noted in FIG. 7.

The second cam pin 154 is operable to be mounted through the aligned pin anchor holes 63 in the spaced actuator support plates 53 and the actuator guide slot 84 as noted collectively in FIGS. 7 and 8.

Each tension spring member 156 is respectively operable to have one end mounted within the spring connector hole 65 on respective ones of the spring support plates 49. An upper end of each tension spring member 156 is connected to outer ends of the support pin 155 which is mounted in the aligned tension spring connector holes 138.

The main handle assembly 118 includes 1) a main handle member 162; and 2) a main bias assembly 164 connected at one end to the main handle member 162 and, at an opposite end, to the cable connector pin 153.

Figure 9:
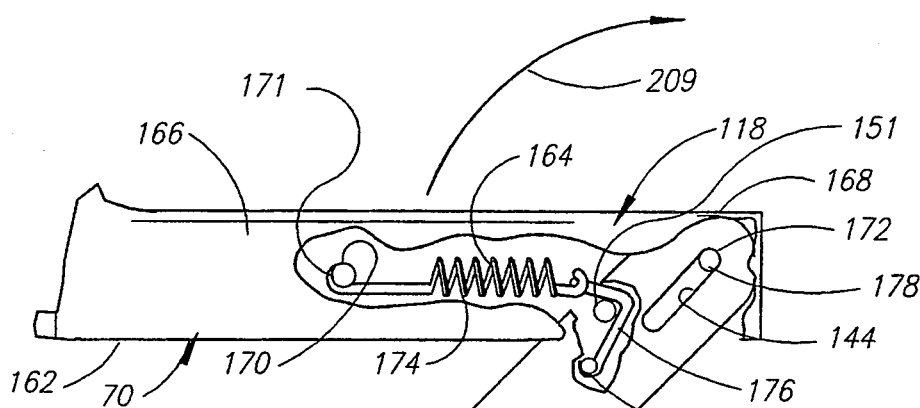
FIG. 9 is a fragmentary elevational view of an actuator brake handle assembly in a non-usage or storage condition with portions broken away for clarity.

The main handle member 162 is provided with an arcuate forward section 166 with an integral support section 168 as noted in FIG. 9. The arcuate forward section 166 is provided with a pair of spaced, aligned spring pin support holes 170 to receive a spring pin support or shaft 171 therein. The arcuate forward section 166 has a curved outer surface for ease of grasping by the snow board operator's hand for movement of the main handle assembly 118 as will be explained.

The support section 168 is provided with a guide pin opening 172 to receive a guide pin or shaft 178 therein for movement in the handle guide slots 144 as will be explained.

As shown in FIG. 9, the main bias assembly 164 includes a tension spring member 174 connected to a flexible cable member 176. The tension spring member 174 has one end thereof connected to the spring support pin 171 and the other end of the cable member 176 is trained about the cable support pin 151 and connected to the cable connector pin 153.

As shown in FIG. 2, the main brake housing assembly 36 includes 1) an outer housing cover member 180 mounted about the main parking brake assembly 34; 2) a boot scraper assembly 182 mounted on an upper forward portion of the outer housing cover member 180; and 3) a handle latch assembly 184 mounted on a top portion of the outer housing cover member 180 and selectively engagable with a portion of the main handle member 162 to achieve a latching function thereto.

The outer housing cover member 180 includes 1) a blade cover section 186; 2) an actuator cover section 188; 3) an arcuate boot contact or handle sections 190; and 4) a top wall section 192. The outer housing cover member 180 is of an integral structure operable to enclose and protect the main parking brake assembly 34 from the elements. The handle sections 190 are of U-shape and operable to be grasped by the snow board operator for ease of conveyance of the snow board member 16.

The boot scraper assembly 182 is provided with a pair of spaced blade members 194 having connector ring members 196 mounted thereon. The blade members 194 have an upper edge portion operable to receive a snow board operator's boot soles thereagainst for scraping and removal of snow and/or ice therefrom. This is an important feature of this invention as snow boarders do not have ski poles which are normally used to remove snow from boots before mounting the boot anchor bindings 18.

The connector ring members 196 can be utilized to connect a conveyance security member 197 such as a strap for ease of conveyance of the snow board member 16 or a padlock and chain assembly for security during storage.

The handle latch assembly 184 includes a latch member 198 pivotally mounted on a latch support shaft 202 and a bias member 204. The latch member 198 has a shaft hole 206 to receive the latch support shaft 202 therein.

The bias member 204 is operable to force the latch member 198 upwardly for engagement with an adjacent top surface of the arcuate forward section 166 of the main handle member 162 to hold in a latched condition under force of the bias member 204 as noted in FIG. 2. A pivot movement of the latch member 198 rearwardly by a hand of the snow board operator will allow the arcuate forward section 166 of the main handle assembly 118 to be grasped and moved upwardly during a braking or parking function.

USE AND OPERATION OF THE INVENTION

In the use and operation of the snow board parking brake apparatus 12 of this invention, it can be readily attached to a new or existing snow board assembly 14 in various locations similar to the location as noted in FIG. 1, being placed along one side wall or edge portion 26 and mounted between the rear and front foot bindings 28, 30 as noted.

The means of attachment of the snow board parking brake apparatus 12 is simple as the support base assembly 32 is placed adjacent the outer side wall portion 26 and the mounting plate member 38 is secured to the snow board member 16 through use of the screw members 57 (FIG. 8). Also, this mounted condition is shown in FIGS. 6 and 7.

In this mounted condition, it is noted that the plate bias assembly 44 operates to hold the base plate member 40 against the mounting plate member 38 but allowing limited pivotal movement about the main hinge member 42 against the compression spring member 64 of respective ones of the plate bias assembly 44.

The snow board parking brake apparatus 12 is in the nonusage or storage condition as shown in FIGS. 1 and 6 (main brake housing assembly 36 removed).

The snow board parking brake apparatus 12 is used by a snow board operator after exiting from a ski lift and having a rear snow boot removed from the boot anchor bindings 18. The operator would place the snow board member 16 transversing a support slope and the side wall portion or edge 26 of the snow board member 16, having the snow board parking brake apparatus 12 mounted thereon, would be placed in an uphill position.

Next, as noted in FIG. 9, the snow board operator would first grasp the handle latch assembly 184 and, more particularly, the latch member 198 and move it outwardly about the pivot lock shaft 202 against the bias member 204. On release of the latch member 198 from contact with an upper surface of the arcuate forward section 166 of the main handle member 162, this would permit upward pivotal movement of the main handle assembly 118 in a direction noted by an arrow 209.

Figure 10:
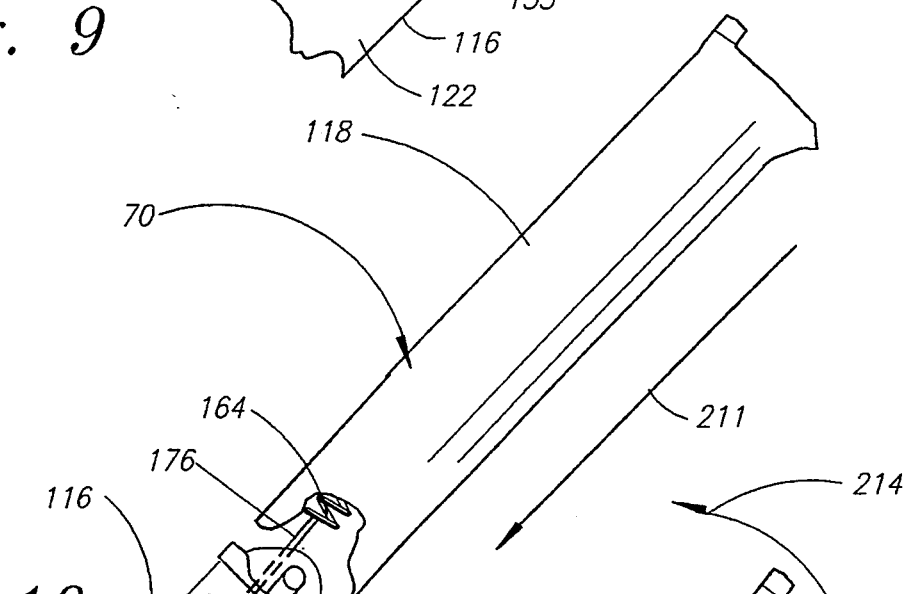
FIGS. 10 and 11 are views similar to FIG. 9 illustrating a portion of the actuator brake handle assembly being moved to an extended condition in preparation of a braking operation.

As noted in FIG. 10, the actuator brake handle assembly 70 continues to be moved upwardly to the position aligned with the actuator support plates 120, 122.

Figure 11:
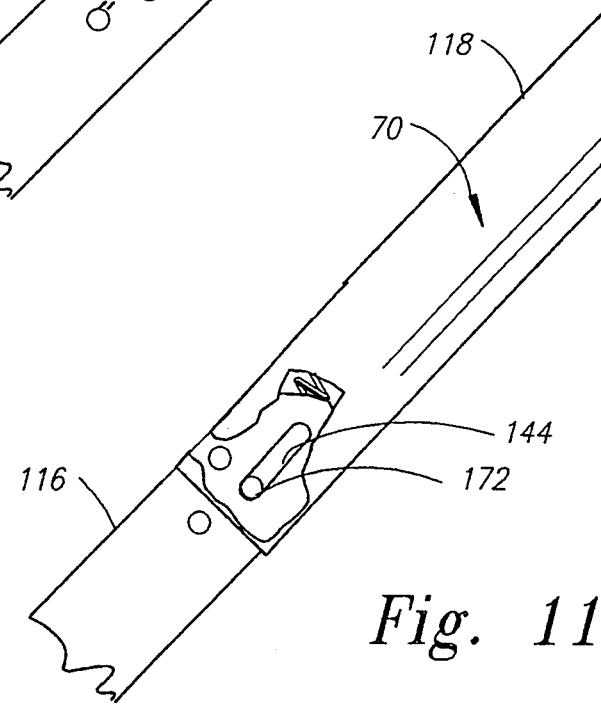

On reaching this axial alignment, the tension spring member 174 moves the actuator brake handle assembly 70 downwardly as noted by the arrow 211 in FIG. 10 to the position noted in FIG. 11. This achieves a locking feature between the main handle assembly 118 and actuator support plates 120, 122 for conjoint forward movement as a rigid handle structure as noted by an arrow 214 in FIG. 11.

On starting forward movement as shown by the arrow 214, the first cam pin member 152 in the movement guide slot 86 acts concurrently with the second cam pin 154 in the actuator guide slot 84 to achieve 1) a first upward movement of the actuator housing member 76; 2) a subsequent downward movement due to the configuration of the actuator guide slot 84 and movement guide slot 86; and 3) a downward movement of the brake blade assembly 74 to the position as shown in FIG. 7.

In the condition of FIG. 7, it is noted that the tension spring members 156 provide for a locked feature due to being over center relative to the parallel pivot link members 146, the first pivot pin 148, the second pivot pin 150, and the first cam pin 152. This is an over centered position and the tension spring members 156 are exerting a force as noted by an arrow 216 to hold in the position of FIG. 7. This provides a clamped, locked position with the brake support edge 88 contacting an upper surface of the base plate member 40 to prevent movement as noted by an arrow 210 in FIG. 7.

The plate bias assembly 44 allows for a shock absorbing engagement of the brake blade assembly 74 on contacting the snow and/or ice as the base plate member 40 can pivot as shown by an arrow 218 in FIG. 6 under bias of the compression spring members 64.

On movement of the movable blade and brake actuator assembly 68 from the parked condition of FIG. 7 to the non-usage condition of FIG. 6, the reverse functions and movement as that described in FIGS. 10, and 11 will occur and the main handle member 162 will be moved to the locked storage condition of FIG. 9.

On movement to this position, the handle latch assembly 184 will assume the condition of FIG. 1 with the latch member 198 engaging the top surface of the arcuate forward section 166 of the main handle member 162 to achieve the locked storage condition.

Although the snow board parking brake apparatus 12 is normally used in a parking function while placed uphill using the lower lower support blade section 106, the inner support blade section 107, the cup type areas 111, and the adjacent edge portion 26, all cooperate to hold the snow board member 16 from movement on an uphill slope line indicated at 220 in FIG. 7.

As noted in FIG. 7, the snow board parking brake apparatus 12 can be used on a downhill slope line 222 using the upper support blade section 104, the lower support section 106, the fin members 110, the cup type areas 111, and the adjacent edge portion 26, all cooperating to hold the snow board member 16 from movement. The cup type areas 111 receive and compact any snow therein to further enhance the resultant parking function.

It is understood that the snow board parking brake apparatus 12 achieves a holding or parking function to the snow board member 16 and not operable nor intended as a brake during movement of subject snow board member 16.

It is seen that the snow board parking brake apparatus of this invention is easy to install on new or existing snow board assemblies; compact for storage but easy to use by a snow board operator for movement to the holding or park condition protected from the elements by a main brake housing assembly; sturdy in construction; and substantially maintenance free.

While the invention has been described in conjunction with preferred specific embodiments thereof, it will be understood this description is intended to illustrate and not to limit the scope of the invention, which is defined by the following claims:

I claim:

1. A snow board parking brake apparatus adapted to be mounted on a snow board assembly, comprising:
   a) a support base assembly connected to the snow board assembly; and
   b) a main parking brake assembly including a brake anchor and support assembly connected to said support base assembly, a movable blade and actuator assembly connected to said brake actuator and support assembly, and an actuator brake handle assembly connected to said movable blade and brake actuator assembly for movement thereof from a non brake position to a snow board brake position;
   whereby said actuator brake handle assembly is selectively moved by an operator of the snow board assembly to move a portion of said movable blade and brake actuator assembly laterally of the snow board assembly to engage an adjacent support surface to achieve a braking function.

2. A snow board parking brake apparatus as described in claim 1, wherein:
   a) said support base assembly includes a mounting plate member secured to the snow board assembly; a base plate member pivotally connected to said mounting plate member and a plate bias assembly mounted between said base plate member and said mounting plate member to permit said base plate member to pivot against said plate bias assembly to provide a cushioning, shock-absorbing means to said main parking brake assembly.

3. A snow board parking brake apparatus as described in claim 1, wherein:
   a) said movable blade and brake actuator assembly includes a main brake actuator assembly connected to a brake blade assembly; and
   b) said main brake actuator assembly having an actuator housing member connected to said brake anchor and support assembly for periodic movement thereof through cam operation to achieve first an upwardly, then laterally, and finally downwardly movement of said brake blade assembly into contact with the adjacent support surface laterally and below the snow board assembly to provide a braking function.

4. A snow board parking brake apparatus as described in claim 3, wherein:
   a) said actuator housing member having a side wall member formed with an actuator guide slot and a movement guide slot therein engagable with portions of said brake handle assembly to achieve a predetermined upward, lateral, and downward movement of said brake blade assembly when moved from a first storage condition to a second brake operation condition.

5. A snow board parking brake apparatus as described in claim 1, wherein:
   a) said movable blade and actuator assembly having a main brake actuator assembly connected to a brake blade assembly; and
   b) said brake blade assembly having a lower support blade section with vertical wall portions and fin members to contact a support surface during a braking operation;
   whereby said vertical wall portions and said fin members are engaged with the adjacent support surface on being moved laterally and downwardly of the snow board assembly on actuation of said actuator brake handle assembly.

6. A snow board parking brake apparatus as described in claim 5, wherein:
   a) said actuator brake handle assembly includes a main actuator assembly connected to a main handle assembly;
   b) said movable blade and brake actuator assembly having a brake blade assembly; and
   c) said main actuator assembly engagable with said movable blade and brake actuator assembly to cause a movement of said brake blade assembly in a cam actuated operation to move laterally and downwardly of the snow board assembly to engage the support surface.

7. A snow board parking brake apparatus as described in claim 6, wherein:
   a) said main handle assembly engagable with said main brake actuator assembly on movement from a storage position to a brake operation position to move said movable blade and brake actuator assembly laterally and downwardly of the snow board assembly.

8. A snow board parking brake apparatus mounted on a snow board member, comprising:
   a) a support base assembly mounted on the snow board member;
   b) a movable blade and brake actuator assembly mounted on said support base assembly;
   c) said movable blade and brake actuator assembly includes a brake blade assembly having a support blade section;
   d) an actuator means connected to said movable blade and brake actuator assembly and selectively operable to move said support blade section of said movable blade and brake actuator assembly to engage a support surface thus achieving a braking function on the snow board member;
   e) a main brake housing assembly mounted about said movable blade and brake actuator assembly to provide enclosure and protection thereto and having thereon a scraper assembly with at least one blade member for use by the operator of the snow board member to scrape off snow boot sole surface; and
   f) said scraper assembly includes a U-shaped handle section operable to be grasped by a snow board operator for ease of lifting and conveyance of the snow board member.

9. A snow board parking brake assembly mounted on a snow board member, comprising:
   a) a support base assembly mounted on the snow board member;

b) a movable blade and brake actuator assembly mounted on said support base assembly;

c) an actuator means connected to said movable blade and brake actuator assembly and selectively operable to move a portion of said movable blade and brake actuator assembly to engage a support surface thus achieving a brake function on the snow board member; and d) said support base assembly having a base plate member pivotal about one end thereof against the force of a plate bias assembly connected to said snow board member and engagable with said base plate member to permit a limited upward movement of said movable blade and brake actuator assembly to provide a spring biased force when contacting an adjacent support surface during a braking operation.

10. A snow board parking brake apparatus as described in claim 9, wherein:

a) said actuator means includes a main actuator assembly operable with said movable blade and brake actuator assembly and a main handle assembly connected through said main actuator assembly to said movable blade and brake actuator assembly; whereby selective movement of said main handle assembly causes said movable blade and brake actuator assembly to move into engagement with an adjacent support surface during a braking function.

11. A snow board parking brake apparatus as described in claim 10, wherein:

a) said main handle assembly includes a main handle member movable to an upwardly extended position to engage said movable blade and brake actuator assembly to the braking condition.

12. A snow board parking brake apparatus mounted on an upper surface of a snow board member adjacent an outer side wall portion, comprising:

a) a support base assembly having a mounting plate member secured to said upper surface adjacent said outer side wall portion;

b) a main parking brake assembly including 1) a brake anchor and support assembly connected to said mounting plate member; 2) a movable blade and brake actuator assembly connected to said brake anchor and support assembly; and 3) an actuator means connected to said movable blade and brake actuator assembly;

c) said movable blade and brake actuator assembly having a main brake actuator assembly connected to a brake blade assembly; and d) said actuator means selectively movable and engagable with said main brake actuator assembly to move said brake blade assembly initially upwardly, then laterally, and finally downwardly to engage a support surface laterally and downwardly of said snow board member.

13. A snow board parking brake apparatus as described in claim 12, wherein:

a) said support base assembly includes a base plate member pivotally connected to said mounting plate member and a plate bias assembly operably connected to said base plate member and said mounting plate member to provide limited pivotal movement of said base plate member due to said plate bias assembly which holds said base plate member under a biasing condition against said mounting plate member.

14. A snow board parking brake apparatus as described in claim 12, wherein:

a) said brake anchor support assembly having connector means thereon secured to said support base assembly and being operably connected to said movable blade and brake actuator assembly.

15. A snow board parking brake apparatus as described in claim 14, wherein:

a) said main brake actuator assembly having an actuator housing member provided with a main body section with 1) an actuator guide slot therein of irregular shape; and 2) a movement guide slot of an arcuate shape; and b) said actuator guide slot and said movement guide slot each operably connected with portions of said actuator means to achieve cam actuated and irregular movement of said movable blade and brake actuator assembly into a first upward movement, a second lateral movement, then an upper movement, and finally to a downward movement to place a portion of said movable blade and brake actuator assembly laterally and downwardly from the snow board member.

16. A snow board parking brake apparatus as described in claim 15, wherein:

a) said actuator means includes a main actuator assembly connected to a main handle assembly;

b) said main actuator assembly having elements therein operably connected to said main brake actuator assembly to control movement thereof; and c) said main handle assembly having a main handle member connected to a main bias assembly; whereby said main handle member is moved from a storage position to a brake operation position to move said movable blade and brake actuator assembly from the storage to the brake function operation position.

17. A snow board parking brake apparatus as described in claim 16, wherein:

a) said main bias assembly having a bias member operable to hold said main handle assembly and in an extended aligned position and being locked in this position while holding said movable blade and brake actuator assembly in the brake function position.

18. A snow board parking brake apparatus mounted on an upper surface of a snow board member adjacent an outer side wall portion, comprising:

a) a support base assembly;

b) a main parking brake assembly including 1) a brake anchor and support assembly connected to said support base assembly; 2) a movable blade and brake actuator assembly connected to said brake anchor and support assembly: and 3) an actuator means connected to said movable blade and brake actuator assembly:

c) said movable blade and brake actuator assembly having a brake blade assembly with a support blade section; and d) said actuator means selectively movable and engagable with said brake blade assembly to move said support blade section to engage a support surface laterally and downwardly of said snow board member.

19. A snow board parking brake apparatus as described in claim 18, wherein:

a) said support base assembly having a mounting plate member secured to said upper surface adjacent said outer side wall portion; and
b) said support base assembly includes a base plate member pivotally connected to said mounting plate member and a plate bias assembly operably connected to said base plate member and said mounting plate member to provide limited pivotal movement of said base plate member due to said plate bias assembly which holds said base plate member under a biasing condition against said mounting plate member.

* * * * *